March 31, 1953     K. L. EMBERSON     2,633,185
DIVIDED SEAT CONSTRUCTION
Filed June 10, 1947

*INVENTOR.*
KEITH L. EMBERSON
BY *R. H. Waters*
ATTORNEY

Patented Mar. 31, 1953

2,633,185

UNITED STATES PATENT OFFICE 2,633,185

DIVIDED SEAT CONSTRUCTION

Keith L. Emberson, Akron, Ohio, assignor to Wingfoot Corporation, Akron, Ohio, a corporation of Delaware Application June 10, 1947, Serial No. 753,703

7 Claims. (Cl. 155—179)

The present invention relates to a split back construction for automobile seats such as used in two-door sedans. Usually with such seats the two adjoining edges of the sections forming the back are as unyielding as the outer edges of the seat construction and therefore uncomfortable.

It is an object of this invention to make the adjoining edges of the sections relatively soft so that if a person sits in the middle of the seat with his back against both sections, he will have a soft, yielding surface which will be comparable with the softness of the seat back at the middle of each section.

Another object of this invention is to make a simplified seat construction which is very durable and inexpensive to manufacture.

Other objects of this invention will appear hereinafter as the description thereof proceeds, the novel features, arrangements and combinations being set forth in the specification and in the claims hereunto appended.

Figure 1:
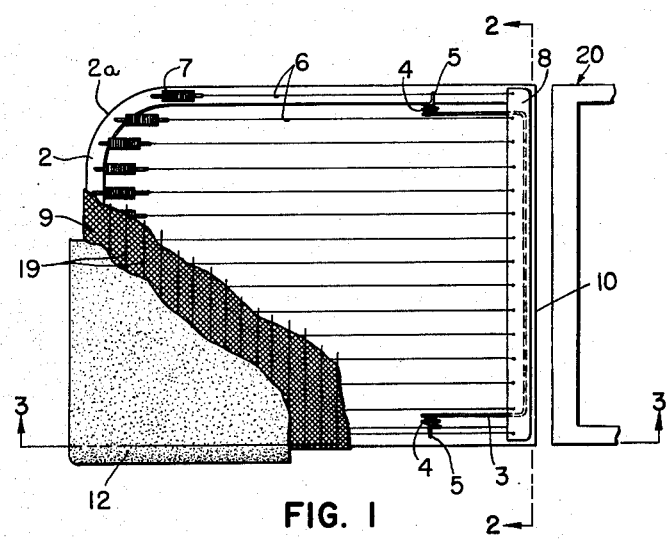
Fig. 1 is a front elevation of the back construction showing the split between the two sections.
Figure 2:
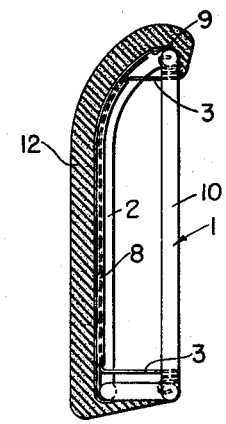
Fig. 2 is a cross section taken substantially along the line 2—2 of Fig. 1.
Figure 3:
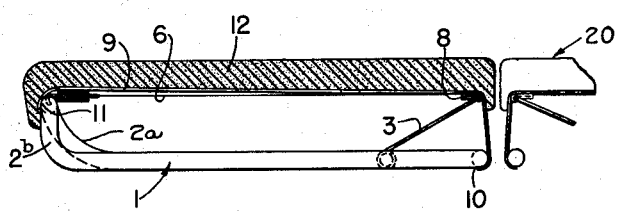
Fig. 3 is a cross section taken along the line 3—3 of Fig. 1.

Referring first to the construction shown in Figs. 1 to 3, inclusive, the reference numeral 1 represents a framework having a forwardly bent portion 2 at the outside lateral edge thereof, the framework being a continuous tubular piece substantially of the shape shown in the drawings with the major portion of the framework to the rear of the section. The only portion of the framework which extends forwardly is the portion 2 at the outer lateral edge of the seat. An upper left corner portion 2ª of the frame 1 connects the portion 2 of the frame to the upper rear portion thereof and is of slightly different shape from a corresponding lower corner portion 2ᵇ. A stiff, bent wire member 3 is formed in a U-shape with coiled spring ends 4 rigidly secured at 5 to the frame 1. The spring is so arranged as to urge the U-shaped portion forwardly or upwardly as viewed in Fig. 3. The wires 6 are connected by springs 7 to the outer edge of the framework at the left as viewed in Fig. 1 and the opposite ends of these wires are connected to a metal strip 8 looped around the central portion of the U-shaped member 3, thus when a pressure is exerted in a downward direction as viewed in Fig. 3, the U-shaped portion is depressed and the springs 7 give the desired resilient action together with the resiliency provided by the coils 4. In order to prevent the U-shaped portion 3 from being moved in a counter-clockwise direction as viewed in Fig. 3 beyond the desired position, a strip of burlap or other material 9 is connected to the frame at 10 and extends all of the way across the upper surface of the wires 6 and is attached to the portion 2 of the framework in any desired manner. Other means could be provided for limiting the rotation of the U-shaped member 3 without departing from the scope of the invention.

On the top surface of the burlap strips 9, I place a layer of cushioning material 12, such as sponge or foam rubber. Due to the fact that the seat itself is quite resilient in its construction, only a relatively thin layer of the rubber is necessary.

Figure 4:
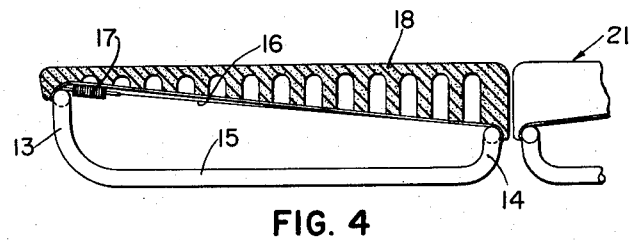
Fig. 4 shows a modified construction, the view being similar to that shown in Fig. 3.

In Fig. 4, I have shown a still further modification in which both the outer edge 13 and the inner edge 14 of the framework 15 are bent forwardly to provide two supports at the outside and inner edges, although the portion 14, which is at the center part of the back construction, is not bent forwardly as much as the portion 13. Wires 16 are connected at one end to the offset portion 14 and at the other end to the springs 17 which, in turn, are connected to the offset portion 13. A layer of sponge rubber or foam rubber 18 is placed over the wires 16 and is made so that the inner portion, which overlies the offset portion 13, is deeper and therefore more resilient than the portion overlying the offset portion 13. The result of this construction is that a very resilient center portion is provided for the seat construction accomplishing the same result as in the other figures described.

If desired, the burlap may be reenforced by wires 19 running vertically to give additional support in that direction, and the wires 19 may be under or over the burlap strips, as desired.

A portion of a seat section 20 is shown in Figs. 1 and 3, and a portion of another seat section, indicated as a whole by the numeral 21, is shown in Fig. 4. These seat sections 20 and 21 correspond to the seat sections shown but are reversed with relation to the lateral portions of the seat sections, as will be readily understood, to provide adjacent seat sections with adjacent yielding edges.

It is obvious that my invention could be applied to the seat portion where the seat portion is divided. Other modifications of this invention are embraced within the scope thereof and therefore I do not wish to be limited in the particular arrangement, combination or construction of parts, except as may be hereinafter set forth in the appended claims.

Having thus fully described my invention, what I claim and desire to secure by Letters Patent of the United States is:

1. A seat construction comprising two adjoining sections relatively and independently movable, a vertically extending framework in each section, adjacent edges of the respective sections being provided with a yielding support.

2. A divided seat back construction in which there is a continuous framework arranged with a vertically directed forwardly offset portion near the outer edge thereof, a series of elements connected to said offset portion and extending horizontally across the framework to define substantially a vertical plane and a substantially vertically extending resilient supporting member at the other side of the framework connected to said elements.

3. A divided back construction for a seat, each section of the back including a continuous framework arranged with a vertically directed forwardly offset portion near the outer edge thereof, a plurality of resilient means connected to said offset portion and extending horizontally across the framework to define substantially a vertical plane and a substantially vertically directed resilient supporting member at the other edge of the framework, said resilient means being connected thereto, said resilient supporting member comprising a U-shaped member, the ends of which are formed into coils attached rigidly to the framework with the intermediate portion of the U-shaped member connected to said resilient means.

4. A device as set forth in claim 3 in which rotation of the U-shaped member forwardly is limited by means connected to the frame and overlying the intermediate portion of the U-shaped member.

5. A device as set forth in claim 3 in which rotation of the U-shaped member forwardly is limited by flexible means connected to the frame and overlying the intermediate portion of the U-shaped member, said flexible means comprising a strip of material connected to the framework and overlying the U-shaped member and connected to the framework at the opposite edge thereof.

6. A divided seat construction in which the back is comprised of a plurality of sections, each having a frame with offset portions extending forwardly of the seat at the outer edges and at the inner edges, the offset portions at the outer edges extending forwardly a greater distance than the adjacent portions at the inner edges, members extending transversely between said offset portions of each section and yieldably connected to said sections, at least at one end thereof, and a padding material overlying said members and being of a greater thickness at the inner edges of the sections than at the outer edges, whereby to provide a seat with substantially uniform yielding characteristics throughout the entire width thereof.

7. A seat construction including a back divided vertically into a pair of sections, each section having a tubular frame defining the top, bottom, and vertical edges of the section, the adjacent vertical edges and the top and bottom edges of the sections lying substantially in a single plane, the outside vertical edge of each section curving forwardly out of the plane of the remaining edges, a vertically extending strip positioned in front of and substantially parallel to the adjacent inner vertical frame edges of each section, a plurality of coiled tension springs secured to the outside vertical frame edges at vertically spaced points, wires extending from the springs to the strips, resilient spring arms securing the top and bottom of each strip to the top and bottom of each frame section for arcuate movement toward the vertical frame edge to tension the coiled springs, and padding over each back section.

KEITH L. EMBERSON.

REFERENCES CITED

The following references are of record in the file of this patent:

UNITED STATES PATENTS

| Number | Name | Date |
|---|---|---|
| 1,852,943 | Swanson | Apr. 5, 1932 |
| 1,945,458 | Weickman et al. | Jan. 30, 1934 |
| 2,272,885 | Rathbun | Feb. 10, 1942 |
| 2,285,827 | Neely | June 9, 1942 |
| 2,293,563 | Ruggles | Aug. 18, 1942 |
| 2,313,020 | Nussbaum | Mar. 2, 1943 |
| 2,399,563 | Neely | Apr. 30, 1946 |

FOREIGN PATENTS

| Number | Country | Date |
|---|---|---|
| 869,168 | France | Oct. 29, 1941 |